United States Patent [19]

Evans

[11] Patent Number: 5,016,608

[45] Date of Patent: May 21, 1991

[54] PORTABLE GRILL APPARATUS

[76] Inventor: Brenda C. Evans, 5713 Willowcrest St., Bakersfield, Calif. 93313

[21] Appl. No.: 470,306

[22] Filed: Jan. 25, 1990

[51] Int. Cl.$^5$ ................................................. F24C 3/08
[52] U.S. Cl. ............................... 126/41 R; 126/275 E; 126/275 R
[58] Field of Search .......... 126/39 BA, 275 E, 275 R, 126/41 R, 41 D; 99/378, 422, 425; 219/429

[56] References Cited

U.S. PATENT DOCUMENTS

| | | | |
|---|---|---|---|
| 3,395,266 | 7/1968 | Price | 126/24 X |
| 4,779,605 | 10/1988 | Smith et al. | 126/211 X |

Primary Examiner—Larry Jones
Attorney, Agent, or Firm—Leon Gilden

[57] ABSTRACT

An apparatus including a planar glass ceramic plate formed with a continuous peripheral wall directed upwardly therefrom about the plate, with a drainage aperture directed adjacent an intersection of the plate and an elongate side wall to direct excss fluids into an underlying container. The plate includes spaced handles at each end thereof, and a thermostat control operatively associated with configured heating coil to direct heat underlying the plate in a predetermined arrangement. The apparatus further includes a modified plate including a planar web bisecting orthogonally a surrounding wall, wherein the wall permits reversing of the plate with the bottom of the wall defining a pocket to assist in heat retention with an upper pocket for accommodating food positioned therewithin for heating thereof. Further, a modified heating coil permits gradient heating by compaction of the coil at one end of the plate, and a greater spacing of coiled members at a further end of the plate.

2 Claims, 4 Drawing Sheets

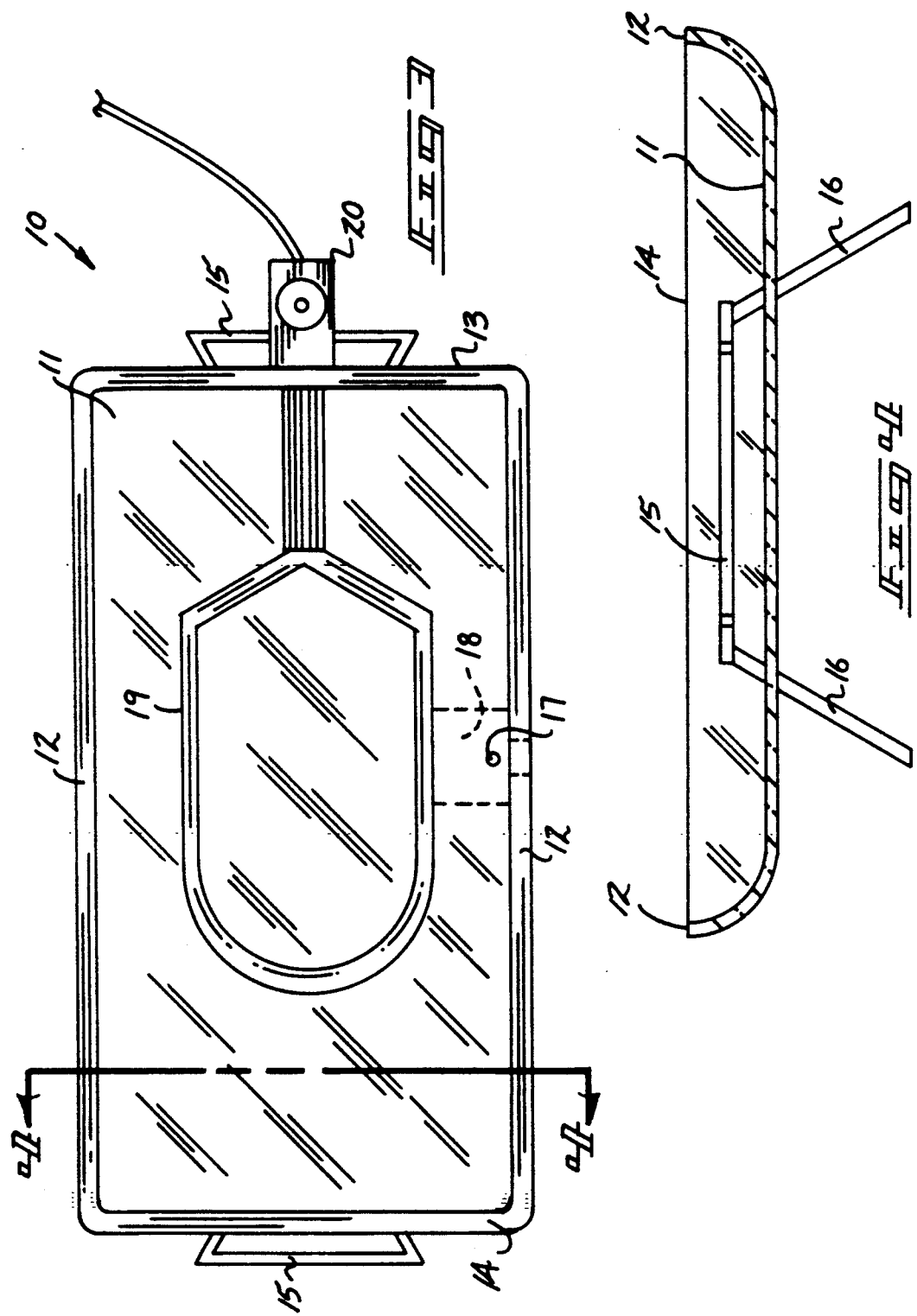

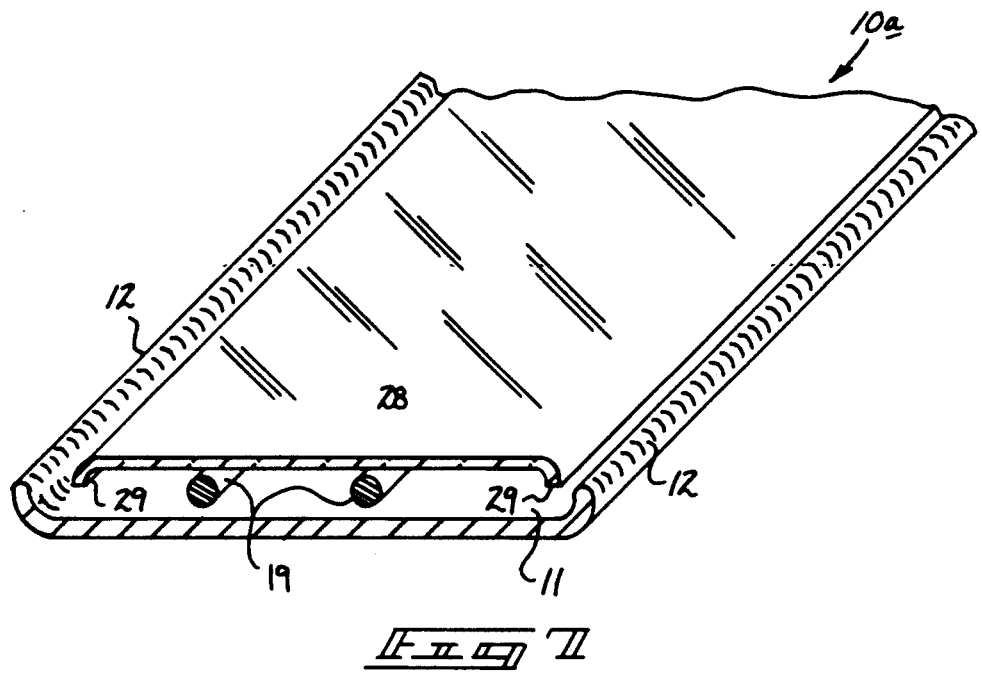
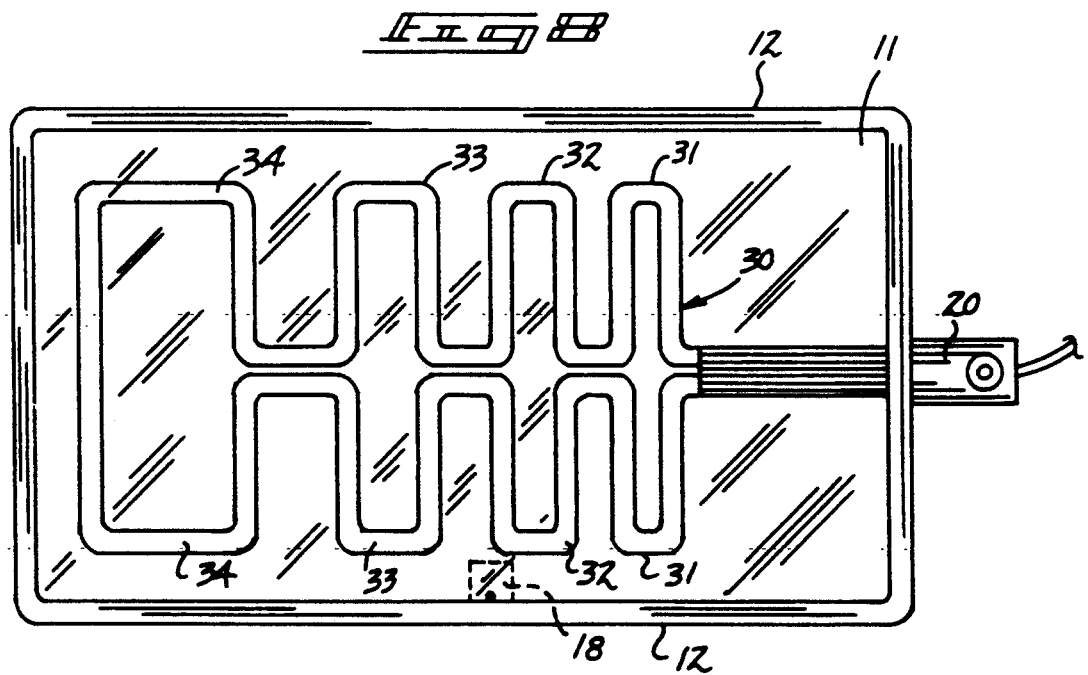

PORTABLE GRILL APPARATUS

BACKGROUND OF THE INVENTION

1. Field of the Invention

The field of invention relates to heating plates, and more particularly pertains to a new and improved portable grill apparatus wherein the same provides convenient and effective heating of food contained within the grill apparatus.

2. Descriptions of the Prior Art

Portable heating and warming grills are known in the prior art. The myriad of configurations of prior art grill apparatus have heretofore failed to provide a convenient and readily available structure for use by individuals to provide a desired gradient heating of various foods contained within the body of the grills. Examples of the prior art include Simpson U.S. Pat. No. 4,724,823 sets forth a gas fired griddle arrangement wherein a removable upper griddle lid is surmounted overlying a gas fired bottom chamber, with heating of the peripheral and corner portions of the griddle by convection.

Blosnich U.S. Pat. No. 4,721,037 provides a barbecue grill arrangement wherein a container including an open forward wall is surmounted over a lava rock grill with a removable grate disposed within the container.

Setzer U.S. Pat. No. 4,800,865 utilizes convection of heated gases within an enclosure overlying a plate surface to enhance the cooking of foods within the apparatus.

Gossler U.S. Pat. No. 4,267,815 provides a thermal cut-out for use with a glass type ceramic cooking surface.

Keating U.S. Pat. No. 4,607,609 sets forth a griddle with a thick metal plate cooking surface heated from below by infra-red gas burner units.

As such, it may be appreciated that there is a continuing need for a new and improved portable grill apparatus which addresses both the problems of ease of use and effectiveness in construction and in this respect, the present invention substantially fulfills this need.

SUMMARY OF THE INVENTION

In view of the foregoing disadvantages inherent in the known types of grill apparatus now present in the prior art, the present invention provides a portable grill apparatus wherein the same provides convenient positioning and heating of foods within a grill surface and further includes a gradient heating of the cooking surface by a uniquely configured electrical resistance heating element. As such, the general purpose of the present invention, which will be described subsequently in greater detail, is to provide a new and improved portable grill apparatus which has all the advantages of the prior art grill apparatus and none of the disadvantages.

To attain this, the present invention provides an apparatus including a planar glass ceramic plate formed with a continuous peripheral wall directed upwardly therefrom about the plate, with a drainage aperture directed adjacent an intersection of the plate and an elongate side wall to direct excess fluids into an underlying container. The plate includes spaced handles at each end thereof, and a thermostat control operatively associated with a configured heating coil to direct heat underlying the plate in a predetermined arrangement. The apparatus further includes a modified plate including a planar web bisecting orthogonally a surround wall, wherein the wall permits reversing of the plate with the bottom of the wall defining a pocket to assist in heat retention with an upper pocket for accommodating food positioned therewithin for heating thereof. Further, a modified heating coil permits gradient heating by compaction of the coil at one end of the plate, and a greater spacing of coiled members at a further end of the plate.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved portable grill apparatus which has all the advantages of the prior art grill apparatus and none of the disadvantages.

It is another object of the present invention to provide a new and improved portable grill apparatus which may be easily and efficiently manufactured and marketed.

It is a further object of the present invention to provide a new and improved portable grill apparatus which is of a durable and reliable construction.

An even further object of the present invention is to provide a new and improved portable grill apparatus which is susceptible of a low cost of manufacture with regard to both materials and labor, and which accordingly is then susceptible of low prices of sale to the consuming public, thereby making such portable grill apparatus economically available to the buying public.

Still yet another object of the present invention is to provide a new and improved portable grill apparatus which provides in the apparatuses and methods of the prior art some of the advantages thereof, while simultaneously overcoming some of the disadvantages normally associated therewith.

Still another object of the present invention is to provide a new and improved portable grill apparatus wherein the same provides a gradient heating of food items by use of a uniquely configured heating element underlying a "U" shaped support pocket for food.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top orthographic view of the instant invention.

FIG. 4 is an orthographic view taken along the lines 4—4 of FIG. 3 in the direction indicated by the arrow.

FIG. 7 is an isometric cross-sectional illustration of a further modified heating tray utilized by the instant invention.

FIG. 8 is a top orthographic view of the instant invention utilizing a further modified heating unit.

DESCRIPTION OF THE PREFERRED EMBODIMENT

Figure 1:
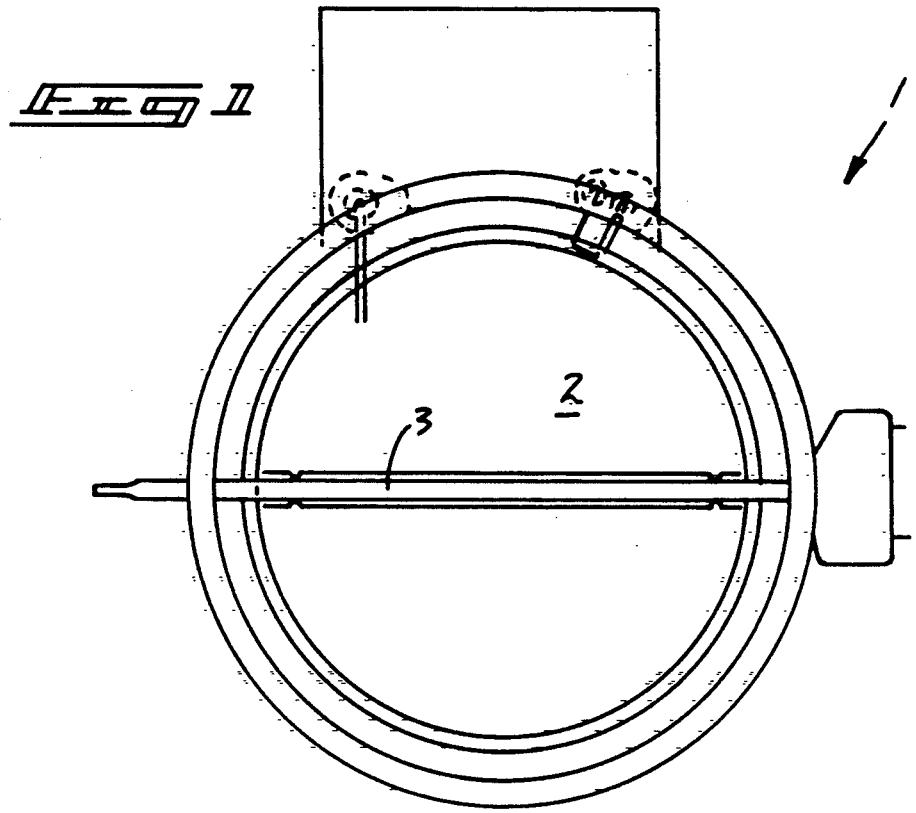
FIG. 1 is a top orthographic view of a prior art food cooking unit.

With reference now to the drawings, and in particular to FIGS. 1 to 8 thereof, a new and improved portable grill apparatus embodying the principles and concepts of the present invention and generally designated by the reference numeral 10 will be described.

Figure 2:
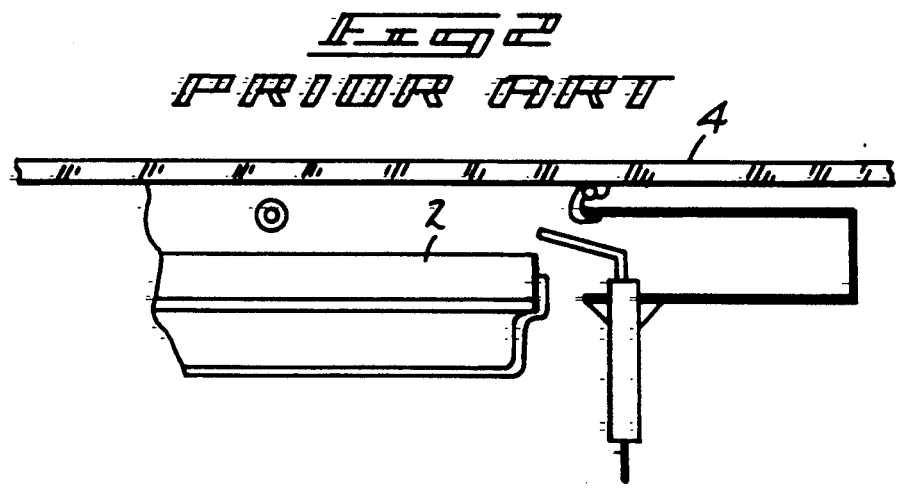
FIG. 2 is an orthographic side view taken in elevation of the prior art unit of FIG. 1.

FIGS. 1 and 2 are illustrative of a prior art heating unit 1 comprising a central burner plate 2 underlying a glass ceramic support 4, with a temperature controlling sensor extending diametrically across the heating unit.

More specifically, the portable grill apparatus 10 of the instant invention essentially comprises a planar glass ceramic plate member 11 formed of a darkened heat retentent ceramic, and includes arcuate upwardly directed side walls 12, with a first end wall 13 and a second end wall 14 orthogonally and continuously formed to the side walls. A "U" shaped handle 15 is fixedly mounted to each exterior surface of the end walls 13 that include pairs of downwardly depending leg members 16 mounted to the handles at terminal side ends of the handle, as illustrated in FIG. 4 for example. A drain opening 17 is mounted medially adjacent an intersection of the plate 11 and a side wall 12, wherein the drain opening 17 is directed downwardly to a catch tray 18 to receive an overflow of fluids supported within the upper surface of the plate 11. An electrical resistance heating coil loop 19 is mounted underlying the plate 11 cooperating with a temperature control and sensor unit 20 to control the quantity and degree of heat within the loop 19.

A modified heating coil 21 includes a series of forwardly and rearwardly directed apex projections 22 defined by the heating coil, wherein the apex projections are arranged at acute angles between adjacent heating element to provide desired heating of remote portions of the plate 11.

Figure 5:
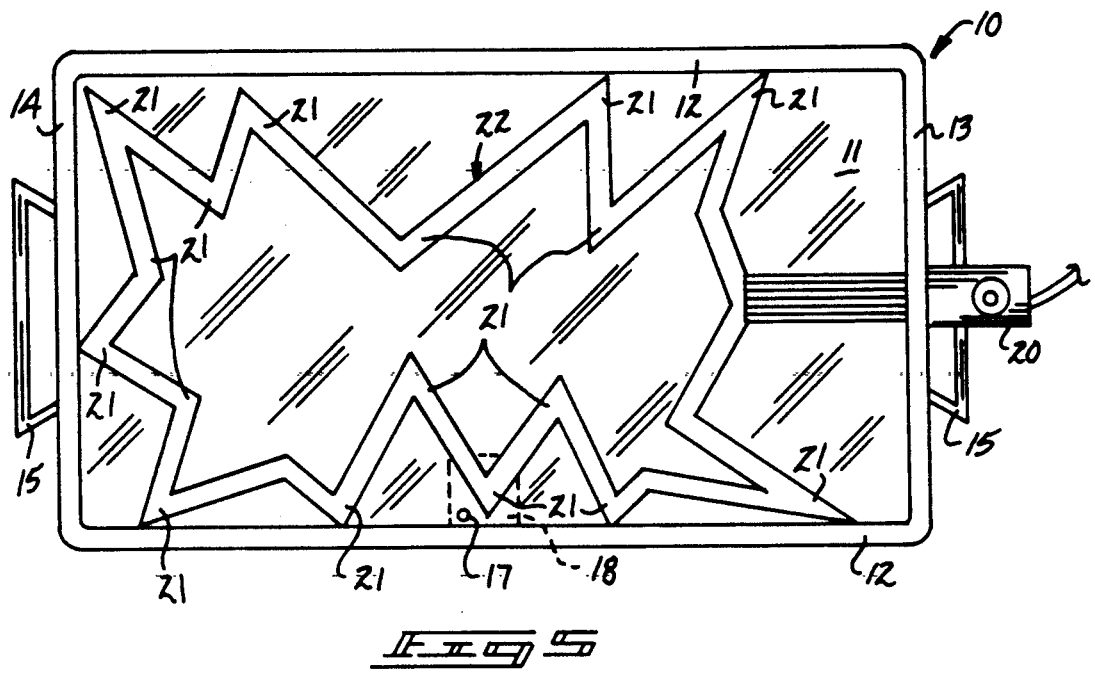
FIG. 5 is a top orthographic view of the instant invention utilizing a modified heating unit.
Figure 6:
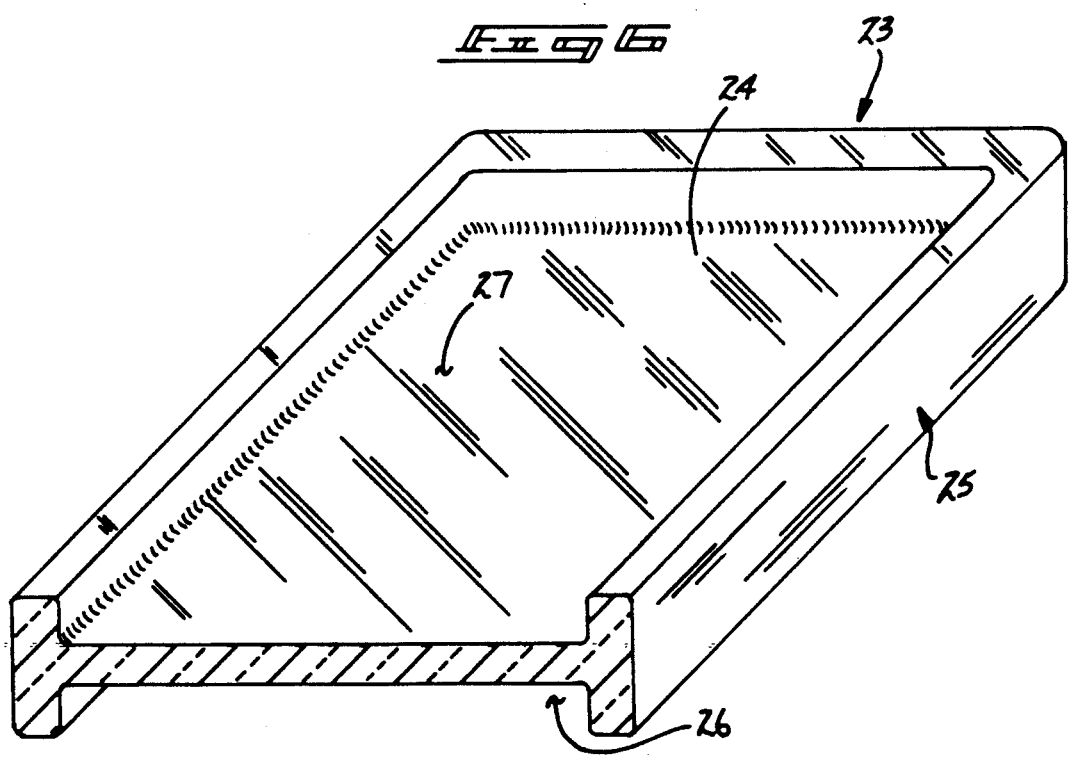
FIG. 6 is a cross-sectional isometric illustration of a modified heating tray utilized by the instant invention.

FIG. 6 illustrates a modified plate member 23 defined by a central planar web 24 orthogonally bisecting a perimeter web 25, wherein the web 25 extends above and below the central web 24. In this manner, the underlying pocket 26 receiving a heating coil, such as illustrated in FIGS. 3, 5, and 8 for example, retains heat within the pocket for directing upwardly through the cooking surface 27, with the upper portion of the perimeter web 25 defining a confining pocket for cooking, such as illustrated in FIG. 4 for example.

FIG. 7 illustrates a further modified member, wherein the heating coil loop 19 is mounted overlying an upper surface of the plate 11, with an inverted generally "U" shaped tray 28 defined by an upper planar surface surmounting the coil 19, wherein the downwardly turned side walls 29 of the tray 28 are positioned interiorly of the side walls 12 of the plate 11 to direct cooking fluids and oils from a cooking procedure to be deposited within the underlying plate 11.

FIG. 8 utilizes a further modified heating coil 30, including a respective first, second, third, and fourth heating coil pair 31, 32, 33, and 34. The respective pairs of heating coils are of an ever increasing spacing between adjacent elements. The compaction of the coil heating elements and their increasing spacing from the first to the fourth heating coils provides a heating gradient across the top surface of the tray 11 to permit different levels of cooking and application of heat to foods positioned within the top surface of the tray 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope invention.

What is claimed as being new and desired to be protected by LETTERS PATENT of the United States is as follows:

1. A portable grill apparatus comprising,
    an opaque ceramic cooking tray including a central planar web, spaced first and second side walls, and spaced first and second end walls, wherein the walls extend around the tray to define a top cooking pocket, and
    a "U" shaped handle member mounted to each external surface of each end wall medially thereof, and
    an angulated electrical heating coil operably associated with the central planar web to effect heating of foods positioned thereon, and wherein the heating coil is positioned overlying the central planar web, and an inverted "U" shaped tray is mounted overlying the central planar web and the heating coil with space legs of the "U" shaped tray directed downwardly and interiorly of the first and second side walls of the tray to direct fluids onto the tray, and further including a drain opening directed through the central planar web, the drain opening cooperating with an underlying catch tray to receive and collect fluids effected by a cooking procedure.

2. A portable grill apparatus comprising, an opaque ceramic cooking tray including a central planar web, spaced first and second side walls, and spaced first and second end walls, wherein the walls extend around the tray to define a top cooking pocket, and a "U" shaped handle member mounted to each external surface of each end wall medially thereof, and an angulated electrical heating coil operably associated with the central planar web to effect heating of foods positioned thereon, and wherein the heating coil is positioned underlying the central planar web and includes a thermostatic control associated therewith, the heating coil includes plural pairs of "U" shaped heating portions, wherein the "U" shaped heating portions are defined by the heating coil, and include a first, second, third, and fourth pair of aligned "U" shaped heating portions, wherein the "U" shaped heating portions are of increasing spacing between each leg of each "U" shaped heating portion to define an increasing spacing to effect a gradient heating of the central planar web, and wherein the central planar web orthogonally bisects the first and second end walls and the first and second side walls, wherein the first and second side walls and the first and second end walls define a continuous wall about the central planar web to permit reversing of the central planar web, and wherein a drain opening is directed at an intersection between the central planar web and one of said side walls.

* * * * *